United States Patent
Benedetti et al.

(10) Patent No.: US 7,739,377 B2
(45) Date of Patent: Jun. 15, 2010

(54) PERFORMING INVENTORY SCAN TO DETERMINE PRESENCE OF PREREQUISITE RESOURCES

(75) Inventors: Fabio Benedetti, Rome (IT); Scot MacLellan, Rome (IT); Marcello Vitaletti, Rome (IT); Jonathan Wagner, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 11/955,512

(22) Filed: Dec. 13, 2007

(65) Prior Publication Data

US 2008/0168459 A1      Jul. 10, 2008

(30) Foreign Application Priority Data

Dec. 19, 2006   (EP)   ................................... 06126448

(51) Int. Cl.
   *G06F 15/173*   (2006.01)
(52) U.S. Cl. ........................................ 709/224; 709/221
(58) Field of Classification Search .................. 709/224
   See application file for complete search history.

(56) References Cited

U.S. PATENT DOCUMENTS

| | | | | |
|---|---|---|---|---|
| 5,721,919 A | * | 2/1998 | Morel et al. ................. | 707/203 |
| 6,202,207 B1 | * | 3/2001 | Donohue ..................... | 717/173 |
| 6,760,761 B1 | * | 7/2004 | Sciacca ....................... | 709/220 |
| 6,880,086 B2 | * | 4/2005 | Kidder et al. ............... | 713/191 |
| 7,150,015 B2 | * | 12/2006 | Pace et al. ................... | 717/176 |
| 2002/0166001 A1 | * | 11/2002 | Cheng et al. ................... | 710/1 |
| 2005/0033767 A1 | * | 2/2005 | Kamentz et al. ......... | 707/104.1 |

\* cited by examiner

*Primary Examiner*—Jeffrey Pwu
*Assistant Examiner*—Youpaporn Nilanont
(74) *Attorney, Agent, or Firm*—Stephen J. Walder, Jr.; Jeffrey S. LaBaw

(57) ABSTRACT

Mechanisms for performing an inventory scan of target data processing systems for ascertaining the presence therein of prerequisite resources are provided. The prerequisite resources are resources necessary for the execution, by the target data processing systems, of predetermined activities. The mechanisms may send to a target data processing systems a request for performing a selected activity of the predetermined activities and associate with the request at least one signature of at least one prerequisite resource different from the prerequisite resources required for performing the selected activity. The signature may include information allowing the target data processing system to locate where the prerequisite resource is to be searched for. Upon receiving, from the target data processing systems a result of the search of the prerequisite resource, the mechanisms may further update information to indicate the presence of the prerequisite resource in the target data processing system.

20 Claims, 6 Drawing Sheets

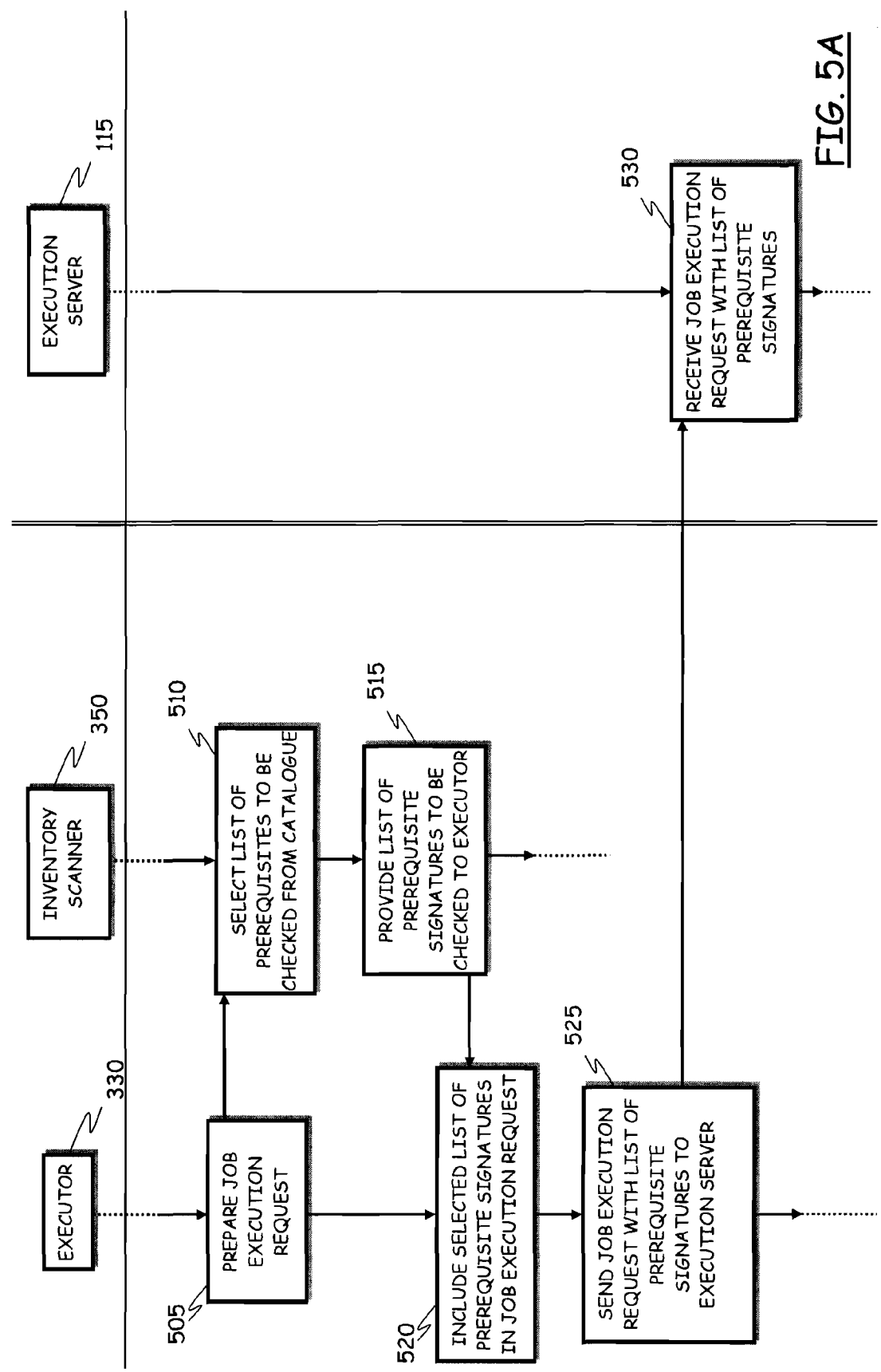

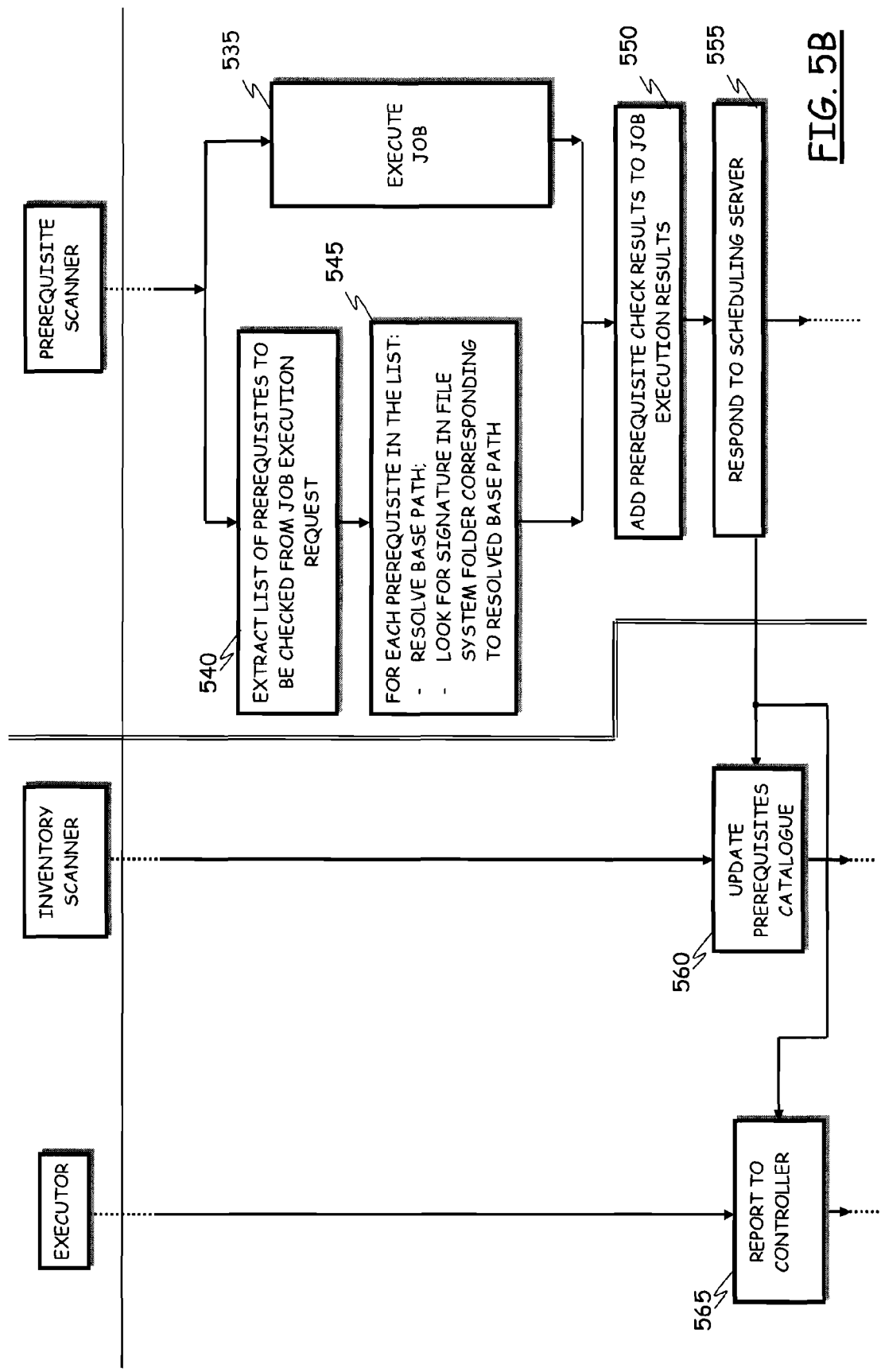

PERFORMING INVENTORY SCAN TO DETERMINE PRESENCE OF PREREQUISITE RESOURCES

TECHNICAL FIELD

The present invention generally relates to the field of electronic data processing (computing), particularly to distributed computing and data processing system networks (shortly, computer networks). More specifically, the invention concerns method and systems for performing inventory scan.

BACKGROUND ART

Software tools for the automated management of distributed data processing systems are available, for facilitating the task of managing distributed data processing systems including large network of computers.

An example of automated system management tools are those directed to managing the distribution of software, e.g. from a central software distribution server, to a plurality of computers in a network; software distribution tools helps keeping the computers in the network up to date and aligned to one another in terms of the installed (release of) software packages.

Another example of automated system management tools are workload (also referred to as "job") scheduling software tools, for controlling the execution of different work units (for example, jobs in a batch processing) by computers in a network.

Often, automated system management tools require a knowledge about the state of a target system (e.g., a computer in the network where a certain software package or application is to be installed, or a computer intended to execute a certain job), in order to successfully execute operations on that target system. Generally speaking, the knowledge about the target systems includes information about prerequisite hardware and software, available system capacity (in terms, for example, of available storage space on the local hard disk of the target system), and current configuration of the target system.

For example, in order for a software distribution application to upgrade a target system to a new level of a certain software package, the current level of the software resident on that target system needs to be known.

In order to get the necessary knowledge about the target systems, automated software distribution tools typically run regular inventory scans, and gather information about all the target systems in a network in a central archive.

A known approach to perform software inventory scans makes use of the concept of "signature": a target system, for example the local file system thereof, is thoroughly scanned, and the names and sizes of the files found in the local file system are compared to a list of signatures, where a signature includes information about the name and the size of a specific file which form the software prerequisite the presence of which on the target system being scanned is to be assessed.

However, this approach is highly intrusive to the target systems, due to the impact inherent in performing a thorough scan on the system being scanned, an operation which is highly resource-consuming. To limit the impact on target systems of resource-intensive scans, the scans are generally rather infrequent, but this has the consequence that the inventory information that is available at the central archive can be stale; due to this, the desired distribution of software may fail.

Known job scheduling applications do not maintain inventory information, nor do they check for the presence of prerequisites on a target system before scheduling the execution, or executing a job on the target system. Nevertheless, a job scheduling application can successfully submit a job for execution by a target system provided that the target system possesses the necessary hardware and software prerequisites required for executing that job, available system capacity so as to be able to complete the intended work within a predetermined deadline time, and the appropriate system configuration to meet the requirements of the job to be executed. Missing such information, the execution of a job submitted to a target system may fail, with the consequence that a whole batch workload plan may be disrupted. Recently, the maintenance of a limited inventory repository for hardware characteristics of the target systems has been proposed, with the possibility of executing software prerequisite checks immediately before the execution of the jobs. This limits the impact of inventory scans on the target systems (software inventory scans generally have a much greater impact on the target systems than hardware inventory scans), but the assessment of the software prerequisites is left to the last moment, with the possibility that a job cannot be executed on a certain target system missing the prerequisite software, and that software provisioning is necessary, or that the job needs to be submitted for execution to a different target system, which itself may lack the required prerequisite software; the result is a waste of time.

SUMMARY OF THE INVENTION

The Applicant has tackled the problem of improving known methods and systems for performing inventory scan, in order to make them less intrusive, and thus having minor impact on the target systems to be scanned for prerequisite hardware and, especially, software.

According to an aspect of the present invention, a method is provided, for performing an inventory scan of target data processing systems for ascertaining the presence therein of prerequisite resources, said prerequisite resources being resources necessary for the execution, by the target data processing systems, of predetermined activities. In one illustrative embodiment, the method comprises, upon sending to a target data processing system a request of performing a selected activity among said predetermined activities, associating to the request at least one signature of at least one prerequisite resource different from the prerequisite resources required for performing the selected activity. The signature, in one illustrative embodiment, includes information allowing the target data processing system to locate where the prerequisite resource is to be searched. The method may further comprise, upon receiving, from the target data processing system, a result of the search of the prerequisite resource, updating information of presence of the prerequisite resource in the target data processing system.

Other aspects of the present invention relate to a system comprising means adapted to carry out the steps of the method, and to a computer program comprising instructions for carrying out the steps of the method when said computer program is executed on a computer. Yet another aspect of the present invention relates to an apparatus comprising a processor and a memory coupled to the processor, the memory comprising instructions which, when executed by the processor, cause the processor to implement the method.

BRIEF DESCRIPTION OF THE DRAWINGS

The features and advantages of the present invention will be made apparent by the following detailed description of an embodiment thereof, provided merely by way of non-limitative example, description that will be made in conjunction with the attached drawing sheets, wherein:

FIGS. 5A and 5B are a schematic flowchart showing the main actions of a method according to an embodiment of the present invention.

DETAILED DESCRIPTION OF THE PREFERRED EMBODIMENT

Figure 1:
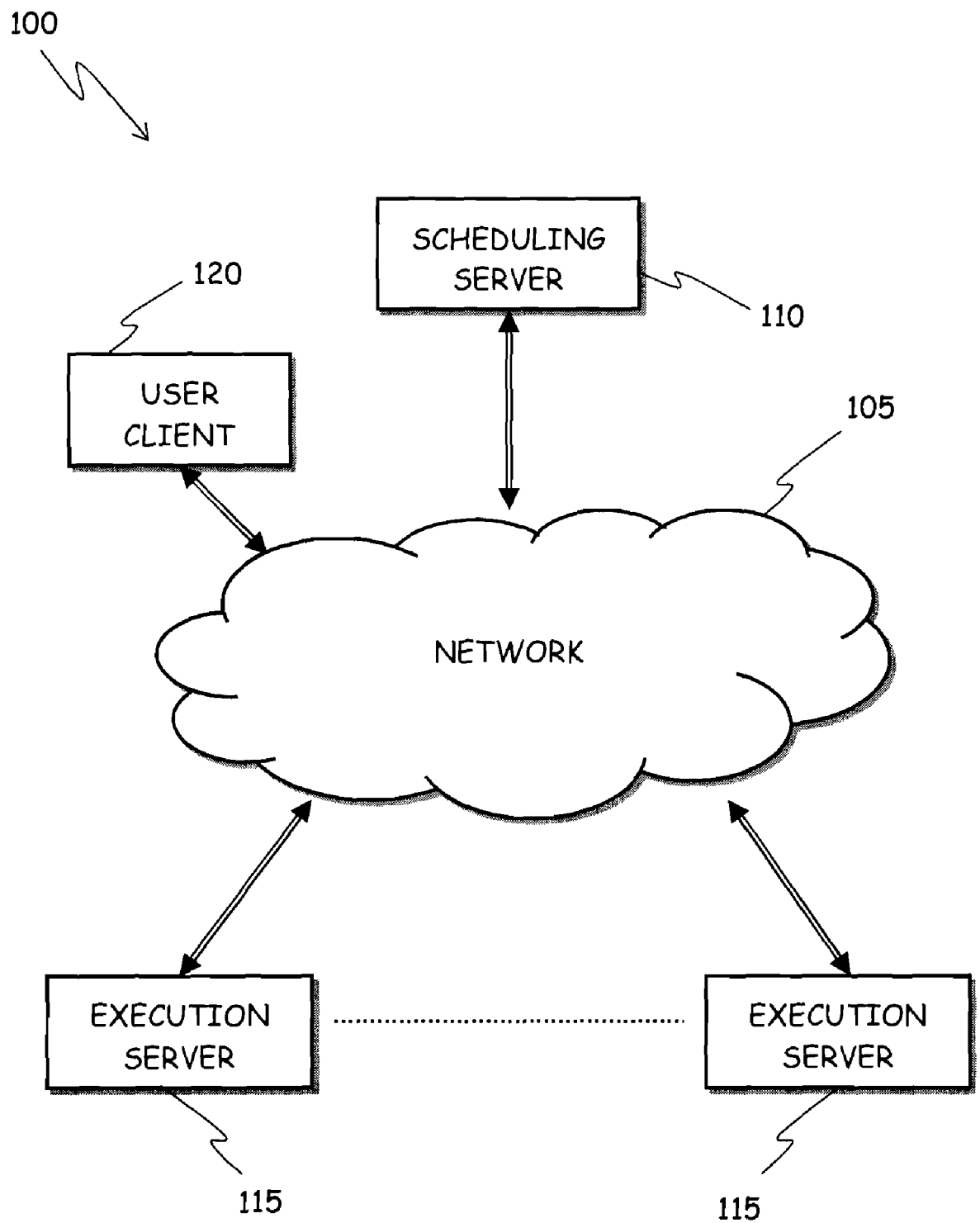
FIG. 1 is a schematic block diagram of a data processing system in which the method according to an embodiment of the present invention is applicable.

With reference to the drawings, and in particular to FIG. 1, a schematic block diagram of an exemplary data processing system 100 is illustrated, in which an inventory scan method according to an embodiment of the present invention can be applied with beneficial effects.

In particular, the exemplary data processing system 100 considered in the invention embodiment being herein described has a distributed architecture, based on a data communications network 105, which may consist of a private LAN (Local Area Network), e.g. an Ethernet, MAN (Metropolitan Area Network), WAN (Wide Area Network), or a public network like the Internet. The data processing system 100 may in particular be the production environment, i.e., the information infrastructure of a SOHO (Small Office/Home Office environment), or of an enterprise, a corporation, a government agency or the like.

Merely by way of non-limitative example, in the following description the case is considered of an automated job scheduling system (shortly, a job scheduler), for automatically controlling the execution of different work units (for example, jobs in a batch processing). An example of known job scheduler is the product named "Tivoli Workload Scheduler" by IBM Corporation; however, it is to be understood that the present invention is not limited to any particular automated job scheduling tool.

In the data processing system 100, a central scheduling server computer (hereinafter, shortly, scheduling server) 110 is configured so as to be capable of submitting the execution of jobs, e.g. non-interactive jobs such as, for example, payroll programs, cost analysis applications, report generation programs, and the like. The scheduling server 110 interacts with one or more other computers, referred to as execution server computers (shortly, execution servers) 115, which are the target (data processing) systems (target nodes) that are responsible of, and that control the actual execution of one or more of the jobs, submitted thereto by and under the supervision of the scheduling server 110. The scheduling server 110 and the execution servers 115 are connected to, and communicate through the network 105. Also schematically shown is a generic user client machine (user client) 120, through which a generic user can submit jobs/workload plans to the scheduling server 110, for their automated execution.

Figure 2:
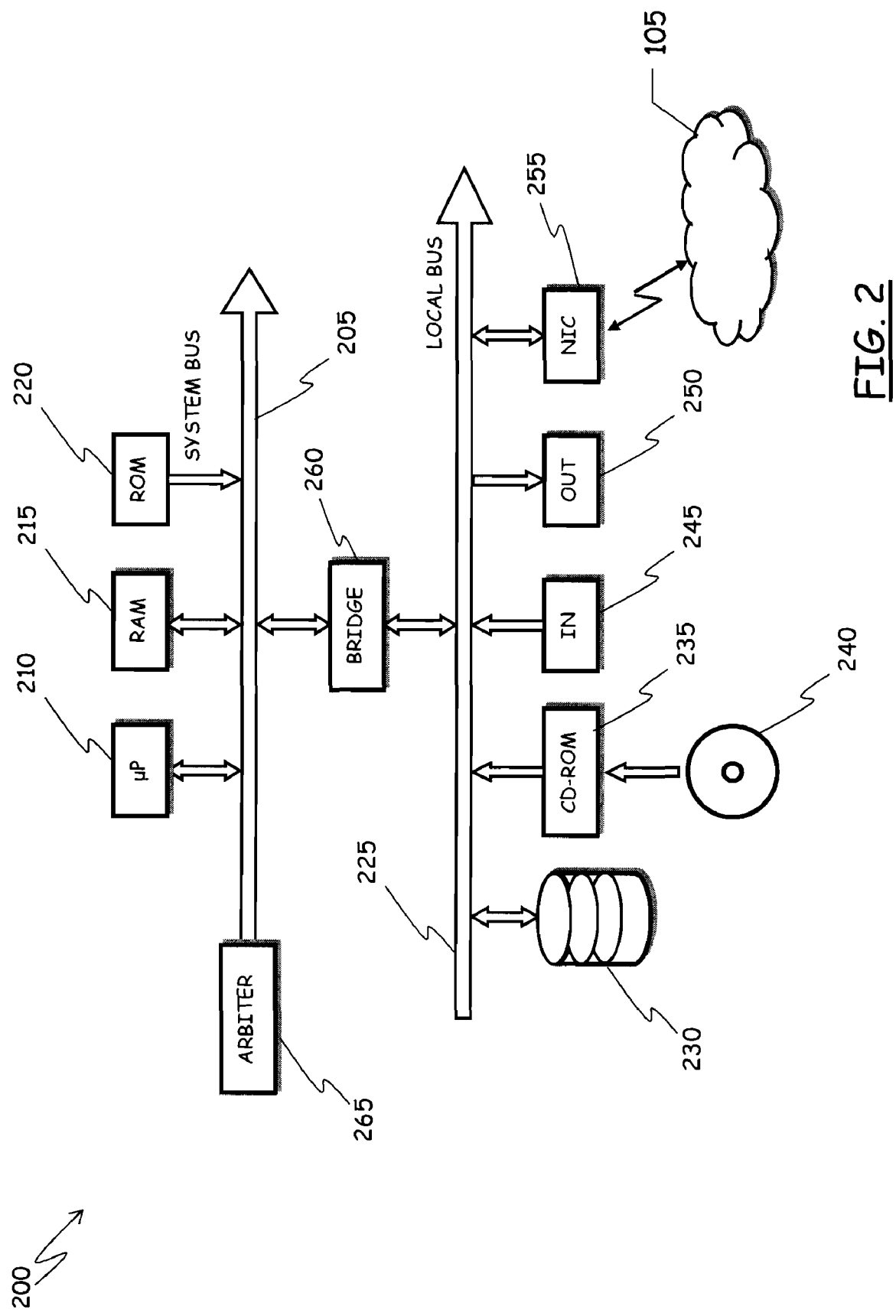
FIG. 2 shows the functional blocks of a generic computer of the data processing system, particularly a scheduling server computer.

As shown in FIG. 2, a generic computer 200 of the data processing system 100, such as the scheduling server 110 (a same or similar structure is also descriptive of the execution servers 115 or the user client machine 120), comprises several units that are connected in parallel to a system bus 205. In detail, one or more microprocessors (µP) 210 control the operation of the computer 200; a RAM (Random Access Memory) 215 is directly used as a working memory by the microprocessors 210, and a ROM (Read Only Memory) 220 stores the basic code for a bootstrap of the computer 200. Peripheral units are connected (by means of respective interfaces) to a local bus 225. Particularly, mass storage devices comprise a hard disk 230 and a CD-ROM/DVD-ROM drive 235 for reading (and, possibly, writing) CD-ROMs/DVD-ROMs 240. Moreover, the computer 200 includes input devices 245, for example a keyboard and a mouse, and output devices 250, such as a display device (monitor) and a printer. A (wired or wireless) Network Interface Card (NIC) 255 is used for the (wired or wireless) connection of the computer 200 to the network 105. A bridge unit 260 interfaces the system bus 205 with the local bus 225. Each microprocessor 210 and the bridge unit 260 can operate as master agents requesting an access to the system bus 205 for transmitting information; an arbiter 265 manages the granting of the access to the system bus 205.

As known to those skilled in the art, a job scheduler is adapted to submit the jobs to be executed according to a predefined execution plan, which establishes a flow of execution of the jobs; the jobs execution order depends on several factors, such as for example temporal constraints (e.g., date, time, day of the week) and dependencies (such as completion of preceding jobs).

Each job typically involves the execution of one or more software programs, and requires several hardware and/or software resources for its execution, such as data processing apparatuses—personal computers, workstations, server machines—operating systems, software applications, databases, storage devices, output devices and the like. The resources needed for the execution of a certain job form the hardware and software prerequisites of that job. The required resources, i.e. the prerequisites, may be defined through their properties; for example, it is possible to specify that the job has to be executed on a computer having a desired operating system, number of processors, available dynamic memory, available storage space, installed software, etc. As discussed in the foregoing, assessing that certain prerequisites (hardware and/or software) are present on a target system that will be delegated to the execution of a job is important, in order to avoid that the job, once submitted to the target system, cannot be executed on that target system due to missing prerequisite resources, with the undesirable consequence that a whole batch workload plan is possibly disrupted.

Figure 3:
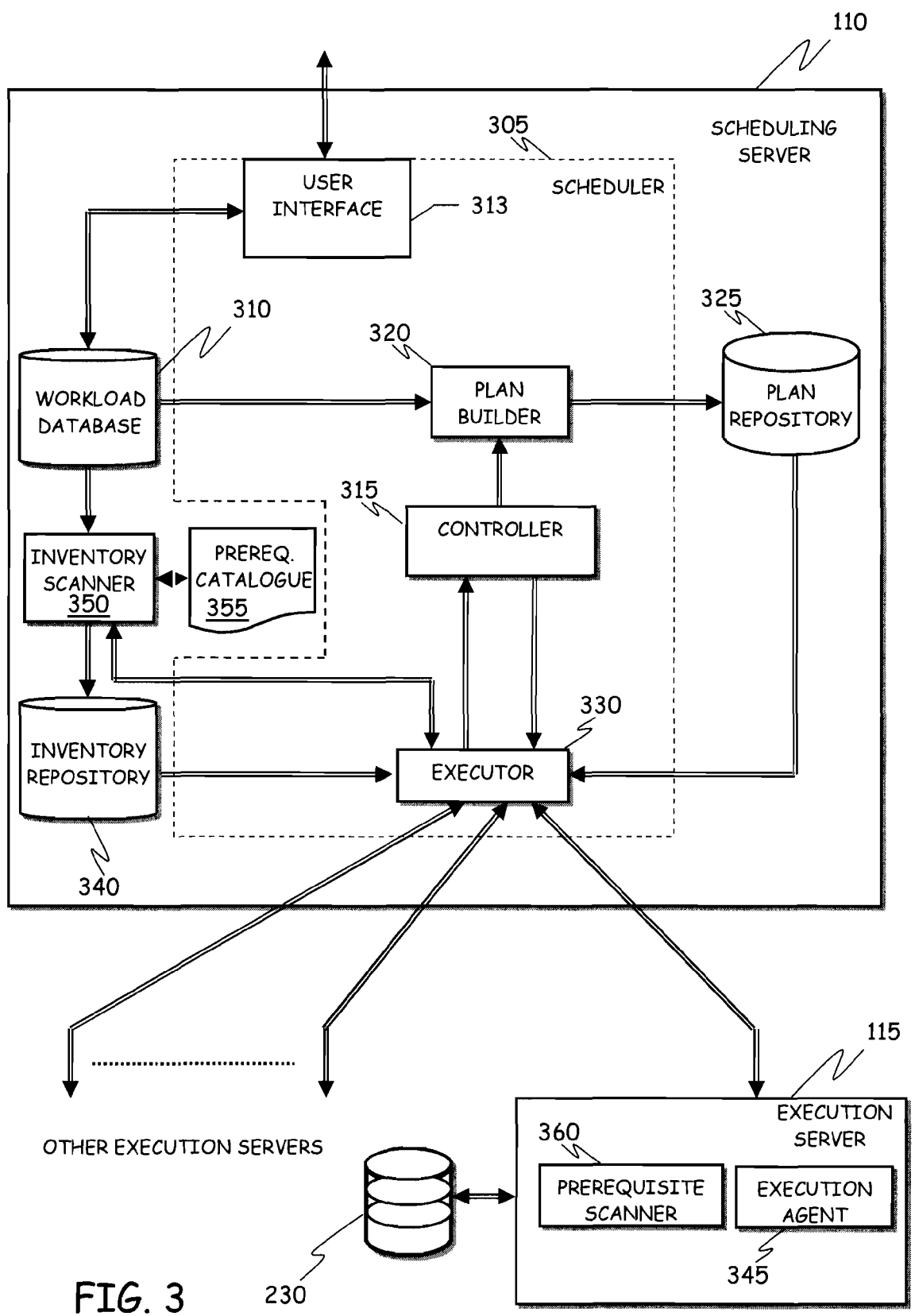
FIG. 3 depicts, in terms of functional blocks, the components, including software components, implementing a method according to an embodiment of the invention.

Referring now to FIG. 3, the functional components, including software components (e.g., modules of software applications when in execution) of the job scheduler considered by way of example in this description, are schematically shown including functional components implementing a method according to an embodiment of the invention. It is intended that programs and data are typically stored on the hard disks or other mass-storage device of the computers, like the scheduling server 110 and the execution servers 115, and they are loaded (at least partially) into the corresponding working memories when the programs are running. Software programs are initially installed onto the computers' hard disks from, e.g., CD-ROMs or DVD-ROMs, or they may be downloaded from, e.g., a distribution server machine through the data communications network 105.

Particularly, a scheduler 305 runs on the scheduling server 110. The scheduler 305 is a software component that is used to automate the submission of desired jobs to the execution servers 115. The jobs to be handled by the scheduler 305 are defined in a workload database 310; jobs can be inserted by users (like the user of the computer 120 in FIG. 1) into the workload database 310 through a user interface 313.

The workload database 310 includes, for each job that is to be scheduled for execution, a respective descriptor, written in a suitable control language, for example, a control language based on XML (eXtensible Markup Language). A job descriptor is a collection of data, and includes in particular a description of the program(s) to be executed on the (execution servers) for the execution of that job, the parameter(s) to be passed to the program(s) to be executed, the scheduling policies, and the hardware and/or software resources (prerequisites hardware and software) required for the execution of the program(s). The resources can consist of any physical or logical entities (for example, operating systems, available working memory, resident software applications, databases, available storage devices and available storage space, output devices and the like); in other words, the resources required for the execution of a certain job, i.e. the prerequisite hardware and software for the job, may relate to the presence, on the target computer that will have to execute the job, of a specific operating system, of a minimum number of processors, of a minimum amount of available working memory and/or storage space, of specific input/output peripherals, specific software applications and, possibly, specific releases thereof, and so on.

The scheduler 305 includes a controller 315, which transmits information about the jobs to be executed to a workload plan builder 320. The plan builder 320 creates one or more execution plans for controlling a flow of execution of batches of jobs in a desired sequence (for example, covering a period of 24 hours). Each execution plan is built according to the information contained in the job descriptors, extracted from the workload database 310; for example, the execution plans are built based on the temporal constraints and the dependencies of the jobs, as defined in their descriptors. The plan builder 320 stores the execution plans thus built into a corresponding repository 325.

The controller 315 requests the execution of selected execution plans to an executor 330. For this purpose, the executor 330 extracts the definition of a current execution plan to be executed from the repository 325. The resources that need to be used by the generic job of the execution plan selected for execution can be specified statically (i.e., identifying the actual physical or logical entities), or through their properties, for example specifying that the job has to be executed on a computer having a desired operating system, number of processors, installed and available memory, storage capacity, installed software applications/releases, dynamic libraries, and so on. In this second case, the actual resources, i.e. the actual physical or logical entities to be used when executing the job can be selected dynamically at runtime, resolving each formal resource required by the job to be executed (as defined in the respective descriptor extracted from the workload database 310) into one or more actual resources, which possess the desired properties, particularly execution servers 115 that have the necessary hardware and/or software prerequisites. To this purpose, an inventory repository 340 is exploited, wherein information is stored about the actual resources of the different execution servers 115 available to the scheduler.

The information thus obtained, indicating in particular the actual resources to be used by the job(s) of the selected execution plan, and especially indicating which of the execution servers 115 is(are) to be used for executing the job(s), is accordingly used by the executor 330 to properly submit each job for execution.

Particularly, the executor 330 interfaces with an execution agent 345 running in background on each execution server 115; the execution agent 345 controls the execution of the jobs on the respective execution server 115 where it is running, in response to corresponding requests received from the executor 330, and returns thereto feedback information relating to the result of the execution of the job. This feedback information is passed by the executor 330 to the controller 315, which, based on the received feedback information, may for example update the corresponding descriptors of the jobs in the workload database 310 accordingly (for example, changing the expected duration of each job that has just completed as a function of its last duration).

According to an embodiment of the present invention, the scheduler 305 further comprises an inventory scanner 350, in the shown example running in the scheduling server 110 (although this is not to be construed as a limitation of the present invention: the inventory scanner might be a module external to the scheduling server).

The inventory scanner 350 is adapted to hold a software (and, possibly hardware) prerequisites catalogue 355, being a list of software (and possibly hardware) prerequisites that the target systems, i.e. the execution servers 115 shall possess in order to be capable of executing the jobs that might be submitted to them. In order to build the prerequisites catalog 355, the inventory scanner 350 may extract information from the workload database 310, where the descriptions of the jobs are stored. In particular, the prerequisites catalog 355 contains, for each prerequisite listed therein, a respective prerequisite signature, uniquely and unequivocally identifying that prerequisite. As discussed in the foregoing, considering for example a prerequisite software application, or a prerequisite dynamic library, the prerequisite signature may include a name of the executable (object code) file of the software application or of the dynamic library, and a size of the executable file.

According to an embodiment of the present invention, the inventory scanner 350 interacts with the executor 330, in such a way that, whenever the executor 330 submits to the execution agents 345 a request for executing a job on the corresponding execution server 115, a selected list of prerequisite signatures, extracted from the prerequisites catalog 355, is always attached to the job execution request by the executor 330, and sent to the execution server 115.

In the execution server 115, a prerequisite scanner module 360 is provided, which is adapted to read the prerequisite signatures in the list attached to a job execution request coming from the executor 330, and to perform a scan of the execution server 115 directed to check the presence of those prerequisites, the check being performed based on the prerequisite signatures.

In particular, according to an embodiment of the present invention, the (list of) prerequisite signatures that the inventory scan module 350 provides to the executor 330 for being attached to the job execution request to be sent to the execution server 115 are "discriminated" signatures, that the prerequisite scanner module 360 is adapted to use for assessing the presence of the corresponding prerequisite in the corresponding execution server 115 by means of a light-impact scan, without the need of performing a resource-consuming thorough scan of the execution server 115, e.g. without having to thoroughly scan the entire local file system in search of a certain file (e.g., the executable code of a prerequisite software application, or a dynamic library) having a predetermined file name and a predetermined file size, as specified in the prerequisite signature. For example, let again the case be considered of a software prerequisite, e.g. a certain software application that needs to be installed on a target system in order for the latter to be able to execute a certain job. A conventional prerequisite signature might in this case be a combination of the name of the file that corresponds to the object (executable) code of the software application, like swapplx.exe, and the size (e.g. in KB) of the file (e.g., x KB); alternatively, the presence of a prerequisite software may be inferred by the existence of one or more dynamic libraries used by the software application. Assessing the presence of the prerequisite software application on the execution server 115 would conventionally imply thoroughly scanning the file system thereof, in search of a file with the specified name swapplx.exe, and, if and once the file is found, comparing its size with the size specified in the signature: this operations have a non-negligible impact on the functionality of the execution server, because they (especially the search through the file system) are highly resource-consuming.

A discriminated signature according to an embodiment of the present invention, that may be used for reducing the impact of the search to be conducted, on the execution server 115, of the required software prerequisite, is for example a file which contains information adapted to allow the prerequisite scanner 360 determine a priori where the file containing the prerequisite signature (in this example, the file swapplx.exe) has to be searched within the file system of the execution server, avoiding the need to perform a thorough scan throughout the file system.

For example, the discriminated signature may include information like the name of the file to be searched and the size thereof, as in conventional prerequisite signatures, and additionally the relative path of the file system folder that, typically, would contain the searched file, and one or more path resolving rules adapted to enable the prerequisite scanner obtaining the base path.

Different types of rules may be defined to allow obtaining the value of the base path: for example, the explicit name of a folder that is the mandatory base path for all the software installations in a given environment, or a variable expression that can be computer by the prerequisite scanner 360, like for example an expression containing system variables and registry keys.

As another example, a software installation program which deployed a prerequisite software resource onto the generic execution server 115 may have registered the software identity and possibly other metadata—typically including the install path—in a registry, from which this information can be retrieved by the prerequisite scanner 360. This registry can be either part of the operating system of the execution server 115, or it can be created and maintained by the installer of the prerequisite software resource. The prerequisite scanner 360 (instructed by the information contained in the discriminated signature received from the scheduling server 110) can therefore access the registry and verify whether there is an entry signalling that a software application with the specified identity has been effectively installed on the system. If install-path information is also available in the registry, the prerequisite scanner 360 can also check whether the files of the prerequisite software are actually present at the specified relative paths under the installation path retrieved from the registry, thus verifying that the registry information is not stale (as it could be in case of an aborted uninstallation of the prerequisite software, which left the registry information behind after removing the files).

As a still further example of discriminated signature, in environments where the installation of software is controlled by a centralized management system, the location of the installed software applications can be predetermined. In this case, the install path of the prerequisite software may be directly included into the discriminated signature (instead of retrieving this information from the data stored in the registry). For instance, an organization may have a policy according to which all software packages—or at least critical software packages from which running jobs may depend—are installed under a "Programs" root folder in the file system of the execution servers, and each software package is installed under a distinct, respective folder—e.g. being assigned a name after the software product name and version—under the Programs root folder. By knowing this information, a discriminated signature can be built to immediately verify the presence of the files of the prerequisite software without a full scan of the file system.

Figure 4:
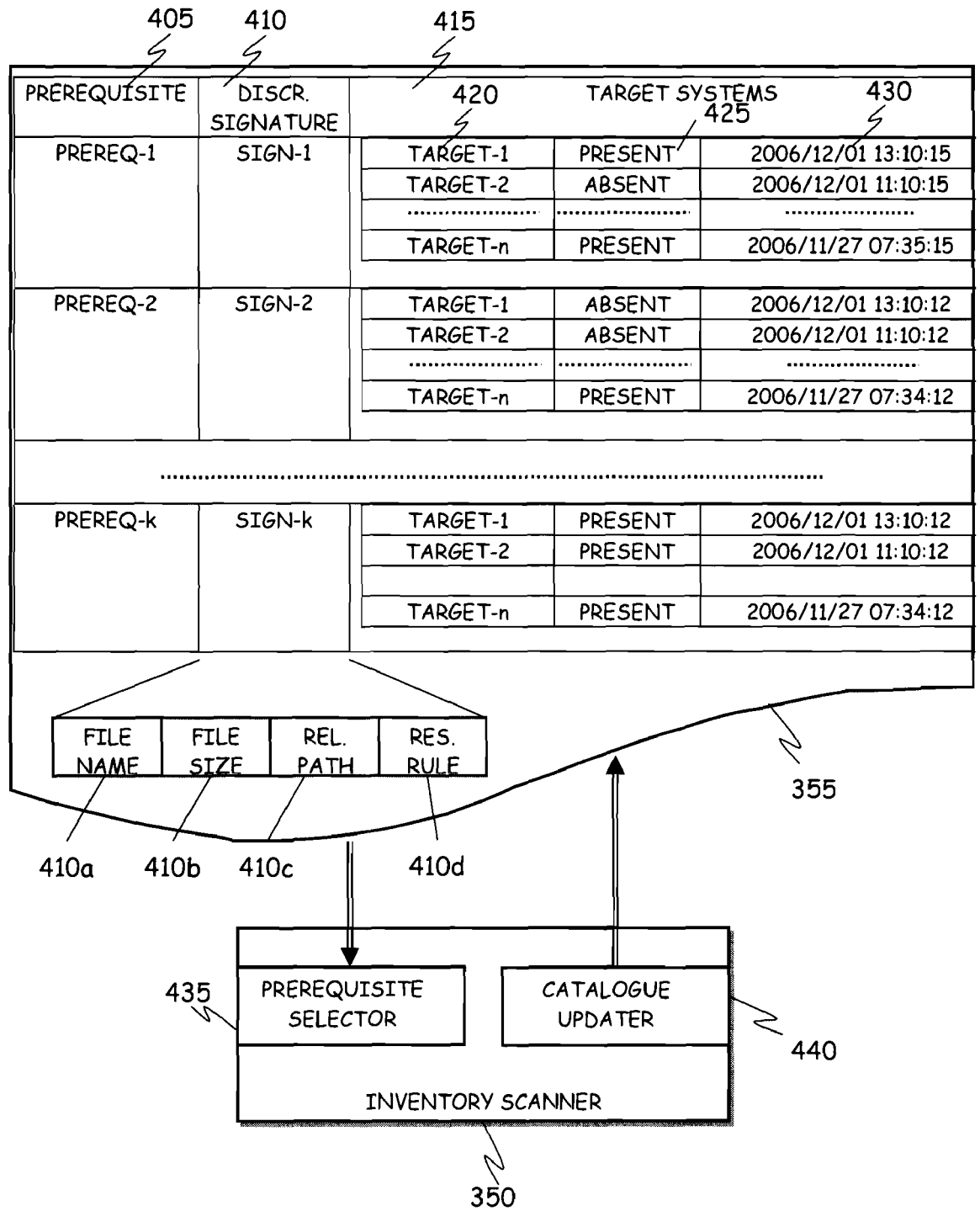
FIG. 4 schematic shows a prerequisite catalogue, according to an embodiment of the present invention.

In FIG. 4 the structure of the prerequisite catalogue 355 is schematically depicted, in an embodiment of the present invention. The catalogue may for example have a tabular form, including several entries, one for each prerequisite resource. Each entry of the catalogue may for example comprise a prerequisite identifier field 405, adapted to store an identifier of the prerequisite (for example, a short, mnemonic nickname of the prerequisite resource), and a discriminated signature field 410, adapted to store the discriminated signature of that prerequisite resource; as described in the foregoing, the discriminated signature field may for example include a file name field 410a, adapted to store the name of the file corresponding to the executable code of a prerequisite software application, a file size field 410b, adapted to store the size of the file containing the executable code of the prerequisite software application, a relative path field 410c, adapted to store the relative path of the folder where the file should be located, in the file system of a generic target system, and a path resolving rule field 410d, adapted to store a rule for resolving the relative path and obtaining the base path; alternatively, the discriminated signature field may include the name (and size) of one or more dynamic libraries the presence of which allows inferring the presence of the prerequisite software application, or the name and size of a file used to uniquely "tag" a specific software application, so that the presence of the prerequisite software application may be inferred by the presence of the tag file. As another example, the discriminated signature field may include the name of a registry where an entry corresponding to the desired prerequisite software is to be searched for. When the file being checked is an executable or a dynamic library, multiple sizes could be specified for a given file name and relative path, corresponding to different maintenance levels applied to the software package, all of which are regarded suitable to satisfy the requirements.

The generic entry of the prerequisite catalogue 355 further includes a target systems field 415, which may be structured as a nested table, including as many entries as the number of target systems; the generic entry of the nested table includes a target system identifier field 420, adapted to store an identifier of a corresponding target system, field 425, adapted to store an indicator of presence/absence of the corresponding prerequisite on that target system, and a field 430, adapted to store an indication of when the last check for presence/absence of the prerequisite on the target system has been performed.

The inventory scanner 350 includes a prerequisite selector 435, adapted to select, from the catalogue 355, the list of prerequisites whose discriminated signatures are to be passed to the executor 330 for being sent to an execution server 115 when the executor sends thereto a job execution request, and a catalogue updater 440 adapted to update the information contained in the catalogue, particularly the data stored in the fields 425 and 430. In particular, the prerequisite selector module is adapted to select a list of prerequisites the presence of which is to be assessed in a target system that corresponds to the execution server 115 to which the executor 330 is going to send a job execution request, where the selection is based on a time criterion that privileges the prerequisites whose presence has been assessed less recently, based on the indications contained in the fields 430. The catalogue updater 440 is adapted to update the data stored in the catalogue 355, particularly in the fields 425 and 430, based on the responses provided by the prerequisite scanners 360 in the execution servers 115.

The schematic flowchart of FIGS. 5A and 5B shows the main actions of a method according to an embodiment of the present invention.

The executor 330, upon receiving a request for execution of an execution plan from the controller 315, prepares a job execution request to be sent to the selected execution server 115 (action 505); the execution server is for example selected based on the information stored in the inventory repository 340. The inventory scanner 350, informed by the executor 330 of the fact that a job execution request is being prepared for the selected execution server, selects a list of prerequisites the presence of which should be assessed on that execution server (action 510); to this purpose, the prerequisite selector 435 accesses the prerequisites catalogue 355, and selects a predefined number of prerequisites to be checked for the selected execution server, based for example on the time criterion discussed above. It is pointed out that the prerequisites that are selected for being checked, and the resulting list of discriminated signatures that are selected to be transported together with the job execution request, may include, but are not limited to the prerequisites needed for the execution of that specific job: even if that job does not have prerequisites, the inventory scanner 350 attaches to the job execution request a list of discriminated signatures that correspond to the prerequisites of different jobs.

The selected list of discriminated signatures is provided to the executor 330 (action 515), to be included in the job execution request. The executor 330 includes the list of discriminated signatures into the job execution request (action 520) and sends the job execution request to the execution server 115 (action 525).

The execution server 115 receives the job execution request from the scheduling server 110, with the included list of discriminated signatures (action 530). The job execution is handled by the execution agent 345, as usual (action 535); the prerequisite scanner 360 extracts instead the list of discriminated signatures from the received job execution request (action 540). For each discriminated signature in the received list, the prerequisite scanner 360 resolves the base path, based on the relative path and the resolving rules contained in the discriminated signature, and then exploits the base path thus obtained to check for the presence of a file having the file name and the file size specified in the discriminated signature, going directly to a specific folder in the file system of the execution server, without having to perform a thorough scan of the file system (action 545). In this way, for each discriminated signature in the list, the prerequisite scanner 360 is capable of determining whether that prerequisite is present on the execution server.

The result of the check performed by the prerequisite scanner 360 are added to the results of the execution of the job (action 550), and are included in a response sent by the execution server 115 to the scheduling server 110 (action 555). In particular, albeit not limitatively, the result of the check performed by the prerequisite scanner 360 may take the form of a vector of Boolean values, one for each discriminated signature in the received list; the generic vector element may take the value "True" if the corresponding prerequisite was found on the target system, "False" otherwise.

Upon receiving the response from the execution server 115, the inventory scanner 350 reads the result of the check performed by the prerequisite scanner 360, and accordingly updates the prerequisites catalogue 355 (action 560): for each of the prerequisites in the list that was previously selected, the indication of presence/absence is updated, and the field 430 is changed to contain the current time indication. The executor 330 reports as conventionally to the controller 315 the results of the job execution (action 565).

Thanks to the present invention, it is possible to maintain an updated repository of data about the presence of prerequisite software in target systems without unacceptably impacting the performance of the target systems. Over time, a picture is built of the state of all of the target systems, so that the scheduling server knows which systems are in an appropriate state to support any particular operation, reducing the risk that an operation is performed on a system that does not have all of the prerequisites (which would result in failure). Several discriminated signatures can be evaluated with a minimal impact for each operation that is executed on a target system. In this way, a repository is quickly built up over time as operations are performed on the target systems.

It is pointed out that although the example provided in the foregoing related to prerequisite software, this is not to be intended as a limitation, because the invention also applies to prerequisite hardware.

Also, although in the previous example the case has been considered of a job scheduler, this is not to be intended as a limitation of the present invention, which can instead be applied in general whenever it is useful to build a repository of inventory information. For example, the invention can be applied to scenarios like software provisioning systems for servers in a data center (where machines are selected at random from a pool to satisfy a provisioning request for a server with a predefined software configuration), or the automated distribution of software.

Although the present invention has been described by way of an embodiment, it is apparent to those skilled in the art that several modifications to the described embodiments, as well as other embodiments of the present invention are possible without departing from the scope thereof as defined in the appended claims.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of the present description, a computer-usable or computer-readable medium can be any apparatus, device or element that can contain, store, communicate, propagate, or transport the program for use by or in connection with the computer or instruction execution system.

The medium can be an electronic, magnetic, optical, electromagnetic, infrared, or semiconductor storage medium, network or propagation medium. Examples of a storage medium include a semiconductor memory, fixed storage disk, moveable floppy disk, magnetic tape, and an optical disk. Current examples of optical disks include compact disk-read only memory (CD-ROM), compact disk-read/write (CD-R/W) and digital versatile disk (DVD). Examples of a propagation medium include wires, optical fibers, and wireless transmission.

The invention can be applied in a data processing system having a different architecture or based on equivalent elements; each computer can have another structure or it can be replaced with any data processing entity (such as a PDA, a mobile phone, and the like).

The invention claimed is:

1. A method, in a data processing system having at least one processor and a storage device, for performing an inventory scan of target data processing systems for ascertaining the presence therein of prerequisite resources, wherein said prerequisite resources are resources necessary for the execution, by the target data processing systems, of predetermined activities, the method comprising:

generating, by the data processing system, a request for a target data processing system to perform a selected activity from said predetermined activities;

selecting, by the data processing system, at least one signature of at least one prerequisite resource required for performing the selected activity, wherein said at least one signature includes location information identifying a location where the target data processing system is to search, in the target data processing system, for the at least one prerequisite resource to determine if the target data processing system has the at least one prerequisite resource;

incorporating, by the data processing system, the selected at least one signature in the request;

transmitting, by the data processing system, the request to the target data processing system, whereby the target data processing system, in response to receiving the request, performs a search for the at least one prerequisite resource, in the target data processing system, based on the location information in the at least one signature; and upon receiving, in the data processing system, from the target data processing system a result of the search of the at least one prerequisite resource, updating information, stored in the storage device of the data processing system, of presence of the at least one prerequisite resource in the target data processing system.

2. The method of claim 1, wherein said at least one prerequisite resource is a software resource, and said at least one signature comprises at least one of a name of at least one file related to the software resource or at least one file size of said at least one file.

3. The method of claim 2, wherein said at least one file related to the software resource is a file containing an executable code of a software application of the software resource.

4. The method of claim 2, wherein said at least one file related to the software resource is a file containing a dynamic library required by the software resource.

5. The method of claim 2, wherein said at least one size includes at least two file sizes, each file size corresponding to a respective release of a software application of the software resource.

6. The method of claim 2, wherein said location information allowing the target data processing system to locate where the prerequisite resource is to be searched comprises indications of a folder in a file system of the target data processing system where the file related to the software resource is to be searched.

7. The method of claim 6, wherein said indications of a folder include a relative path of a folder in a file system of the target data processing system where the file related to the software resource is to be searched, and data adapted to enable the target data processing system to obtain a base path.

8. The method of claim 1, wherein said at least one signature of at least one prerequisite resource which is incorporated in the request sent to the target data processing system is selected from a list of signatures, and wherein the selection of said at least one signature of at least one prerequisite resource from said list of signatures is made based on a less recently ascertained presence criterion.

9. The method of claim 1, wherein the location information comprises a relative path of the file system folder that contains the prerequisite resource and one or more path resolving rules for obtaining a base path.

10. The method of claim 9, wherein the one or more path resolving rules comprises a rule for searching a name of a folder, identified in the location information, that is a mandatory base path for all resources in a target data processing system environment.

11. The method of claim 9, wherein the one or more path resolving rules comprises a rule for searching a registry of the target data processing system for a registry of the prerequisite resource.

12. The method of claim 11, wherein the one or more path resolving rules further comprises a rule for retrieving install-path information from the registry and searching files in a location specified by the install-path information for the prerequisite resource.

13. A computer program product comprising a computer readable storage medium having a computer readable program stored thereon, wherein the computer readable program, when executed on a computing device, causes the computing device to perform an inventory scan method on at least one target data processing system for ascertaining the presence therein of one or more prerequisite resources, wherein the one or more prerequisite resources are resources necessary for execution, by the target data processing system, of predetermined activities, the method comprising:

generating a request for a target data processing system to perform a selected activity from said predetermined activities;

selecting at least one signature of at least one prerequisite resource required for performing the selected activity, wherein the at least one signature includes location information identifying a location where the target data processing system is to search, in the target data processing system, for the at least one prerequisite resource to determine if the target data processing system has the at least one prerequisite resource;

incorporating the selected at least one signature in the request;

transmitting the request to the target data processing system, whereby the target data processing system, in response to receiving the request, performs a search for the at least one prerequisite resource, in the target data processing system, based on the location information in the at least one signature;

receiving, from the target data processing system, a result of the search of the at least one prerequisite resource; and updating information, stored in the computing device, indicating presence or non-presence of the at least one prerequisite resource in the target data processing system.

14. The computer program product of claim 13, wherein said at least one prerequisite resource is a software resource, and said at least one signature comprises at least one of a name of at least one file related to the software resource or at least one file size of said at least one file.

15. The computer program product of claim 14, wherein the information used by the target data processing system to locate where the prerequisite resource is to be searched comprises indications of a folder in a file system of the target data processing system where the file related to the software resource is to be searched.

16. The computer program product of claim 15, wherein the indications of a folder include a relative path of a folder in a file system of the target data processing system where the file related to the software resource is to be searched, and data adapted to enable the target data processing system to obtain a base path.

17. The computer program product of claim 14, wherein the at least one file related to the software resource is one of a file containing an executable code of a software application of the software resource and a file containing a dynamic library required by the software resource.

18. The computer program product of claim 14, wherein the at least one size includes at least two file sizes, each file size corresponding to a respective release of a software application of the software resource.

19. The computer program product of claim 13, wherein the at least one signature is selected from a list of signature based on a less recently ascertained presence criterion.

20. An apparatus, comprising:

a processor; and a memory coupled to the processor, wherein the memory comprises instructions which, when executed by the processor, cause the processor to:

generate a request for a target data processing system to perform a selected activity from said predetermined activities;

select at least one signature of at least one prerequisite resource required for performing the selected activity, wherein the at least one signature includes location information identifying a location where the target data processing system is to search, in the target data processing system, for the at least one prerequisite resource to determine if the target data processing system has the at least one prerequisite resource;

incorporate the selected at least one signature in the request;

transmit the request to the target data processing system, whereby the target data processing system, in response to receiving the request, performs a search for the at least one prerequisite resource, in the target data processing system, based on the location information in the at least one signature;

receive, from the target data processing system, a result of the search of the at least one prerequisite resource; and update information, stored in the apparatus, indicating presence or non-presence of the at least one prerequisite resource in the target data processing system.

* * * * *